INVENTOR.
BRUCE A. KAUFMAN
BY Alden D. Redfield
Charles M. Hogan
ATTORNEYS

Feb. 13, 1962 B. A. KAUFMAN 3,021,492

AUTOMATIC PHASE CONTROL SYSTEM

Original Filed Oct. 7, 1958 2 Sheets-Sheet 2

INVENTOR.
BRUCE A. KAUFMAN
BY Alden D. Redfield
Charles M. Hogan.
ATTORNEYS

United States Patent Office 3,021,492

Patented Feb. 13, 1962

3,021,492

AUTOMATIC PHASE CONTROL SYSTEM

Bruce A. Kaufman, Los Angeles, Calif., assignor to Avco Corporation, Cincinnati, Ohio, a corporation of Delaware Continuation of application Ser. No. 765,902, Oct. 7, 1958. This application Apr. 11, 1961, Ser. No. 102,317
1 Claim. (Cl. 331—28)

This invention relates to automatic phase control systems of the type wherein the output of a local oscillator is stabilized in phase with respect to the phase of a reference signal.

The present patent application is a continuation of United States patent application Serial No. 765,902, filed October 7, 1958, entitled "Automatic Phase Control System," which is now abandoned. Both applications are assigned to the same assignee.

Automatic phase control systems of the type described herein are especially suitable for use in color television systems. They find application in such television systems in those portions of the television receiver wherein it is necessary to synchronize the phase of a local color subcarrier oscillator with the phase of a transmitted reference signal, often called a "burst" signal. For television applications, it is desirable that the phase control systems comprise a minimum number of component parts and be inexpensive to manufacture and maintain, and especially that it be relatively immune to noise and other amplitude disturbances which might tend to upset the "locked in" condition. Furthermore, it is desirable that an automatic phase control system require a minimum number of "critical" adjustments for satisfactory operation and also possess a high speed of response.

Accordingly, it is an object of this invention to provide an automatic phase control system which is simple and inexpensive in construction.

It is a further object of this invention to provide an automatic phase control system which is easily adjusted for accurate operation and which possesses a high speed of response.

It is a still further object of this invention to provide a phase detector for use in a phase control system, which detector serves the additional function of amplitude limiting to effectively discriminate against spurious or "noise" signals.

It is an additional object of this invention to provide a phase detector which requires virtually no power from the source of reference signals or the controlled local oscillator and which possesses a voltage gain characteristic in addition to its phase detecting function.

Briefly, the automatic phase control system of the invention comprises a novel "single-ended" phase detector device which functions to compare the phase of the reference signal with the phase of the output signal from the local oscillator. The error signal representing the phase difference between the reference signal and the local oscillator signal is coupled to a controlling device associated with the resonant or "tank" circuit of the local oscillator to control its phase. In a preferred embodiment of the invention, the phase-controlling means comprises a voltage-sensitive capacitor utilized as the capacitor of the resonant circuit. Alternatively another embodiment of the invention permits the use of a control variable resistance connected in shunt with the tank circuit as the phase controlling device. In still another embodiment of the invention, a pair of semiconductor diodes are utilized as the means for controlling the phase of the local oscillator.

The novel phase detector of the invention in a preferred form comprises a gated beam pentode tube having its control grid connected to the source of reference signals and its suppressor grid coupled to receive the output signals from the local oscillator. The tube is operated at a level such that the application of a signal to either the control grid or suppressor grid is sufficient to drive the tube to cut-off during the negative excursions of the signal. By this means, when the signals being compared are 180° out of phase with respect to each other, there is no output signal from the tube. When the signals are exactly in phase, the tube output will be a maximum. For phase differences between 0° and 180°, the output of the tube will be proportional to the phase difference. Since a single-ended tube of the gated beam pentode type is employed for the phase detector, the detector itself provides considerable amplitude limiting of the signals from the reference source and the local oscillator. This, of course, permits the use of much smaller integrating circuits in the output of the phase detector, with the result that the speed of response of the over-all phase control system is materially increased. Furthermore, the use of a single-ended gated beam pentode tube for the detector itself provides a voltage gain for the over-all system, thus eliminating or reducing the need for separate D.C. amplifiers in the control loop.

Figure 1:
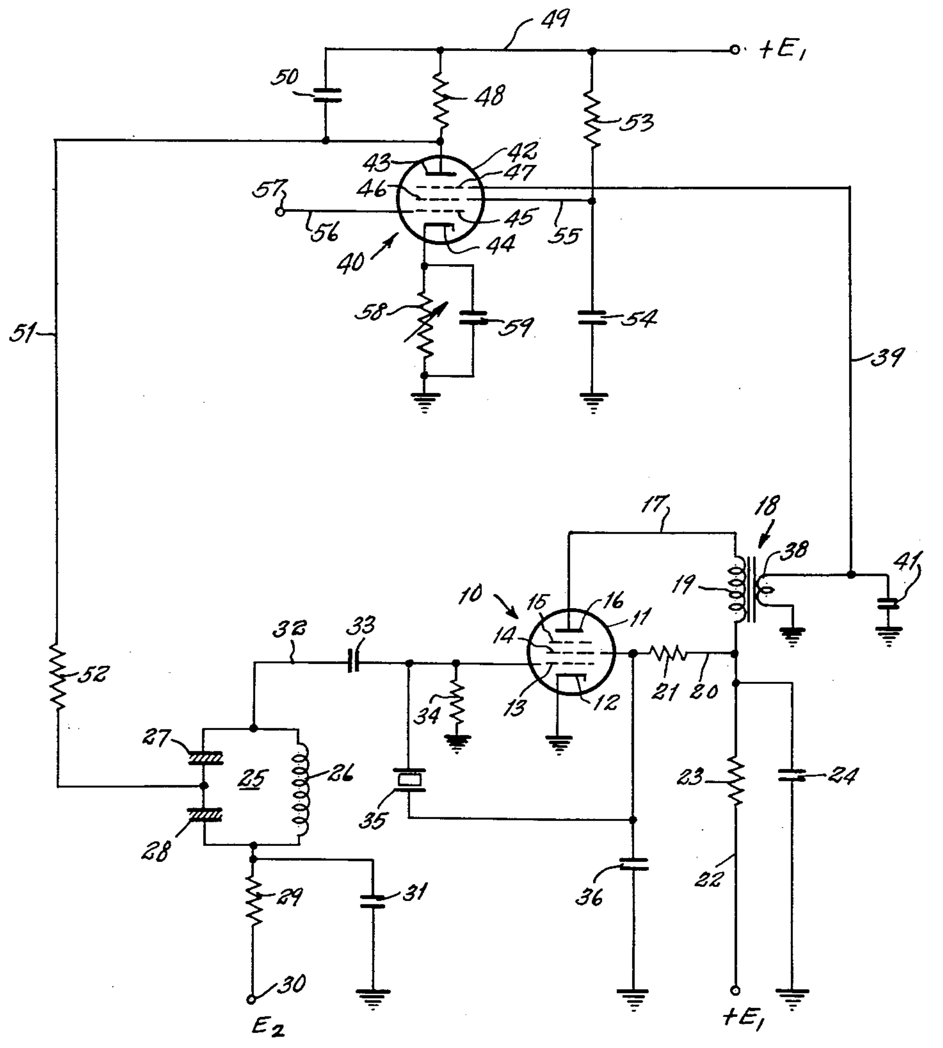
FIG. 1 is a circuit diagram of an automatic phase control system constituting a preferred embodiment of the invention.

Referring now to FIG. 1 of the drawing, there is shown an automatic phase control system comprising a local oscillator 10 of the electron coupled type. Oscillator 10 includes a pentode tube 11, such as the pentode section of a 6U8, for example, having a cathode 12, control grid 13, screen grid 14, suppressor grid 15, and plate 16. As seen in the drawing, cathode 12 is directly grounded, while plate 16 is connected by a lead 17 to the primary winding 19 of an output transformer 18. The other side of the primary winding 19 is connected to a plate supply voltage $E_1$ through lead 22 and voltage-dropping resistor 23. A capacitor 24 provides an A.C. return for the plate circuit of the oscillator tube to the grounded cathode. The screen grid 14 receives its potential from the junction of transformer primary 19 and resistor 23 by way of lead 20 and voltage-dropping resistor 21, with a small capacitor 36 coupling screen grid 14 to ground. The usual resonant or "tank" circuit 25 of the local oscillator is shown as comprising coil 26 and serially-connected voltage-sensitive capacitors 27 and 28. The voltage-sensitive capacitors may be of the type described in pages 83–88 of the publication Electrical Manufacturing for December 1954. These capacitors are often called "non-linear" capacitors, in that their capacitance varies as a function of the applied voltage. One end of the tank circuit 25 is connected by resistor 29 and lead 30 to voltage source $E_2$. Capacitor 31 serves as the usual A.C. return to ground. The other side of the tank circuit is coupled by lead 32 and an R-C coupling circuit comprising capacitor 33 and resistor 34 to the control grid 13 of the oscillator tube.

As thus far described, it will be seen that local oscillator 10 is a conventional electron-coupled oscillator which provides an output signal at transformer 18, the frequency and phase of the output signal depending upon the resonant frequency of tank circuit 25. For reasons which will hereinafter be explained, a crystal 35 may be coupled between the control grid 13 and the screen grid 14 of the oscillator tube.

A secondary winding 38 is provided on the output transformer 18 to derive a sample of the output voltage of the oscillator. A small capacitor 41 is shunted across the secondary winding 38 to form a tuned output circuit therewith. Lead 39 couples the derived sample of the oscillator output voltage to the suppressor grid 47 of a gated beam pentode tube 42 forming the phase detector 40 of the system. The beam pentode tube 42 may be a 6BN6, for example, and comprises a cathode 44, control grid 45, screen grid 46, suppressor grid 47, and plate 43. The plate 43 of the tube is connected by plate resistor 48 and lead 49 to plate supply voltage $E_1$. A capacitor 50 is shunted across plate resistor 48 to provide an A.C. bypass filter. The plate 43 is also coupled by lead 51 and resistor 52 to the junction of the voltage-sensitive capacitors 27 and 28 in the tank circuit of the local oscillator. Resistor 53, capacitor 54, and lead 55 provide the usual screen supply voltage for the pentode 42. The control grid of the tube is connected by lead 56 to a terminal 57 of the reference signal source (not shown). The cathode 44 of tube 42 is connected to ground through a self-biasing circuit comprising variable resistor 58 and capacitor 59.

In operation, the circuit for the gated beam pentode 42 is set and designed so that either grid 47 or grid 45 will drive the tube to cut-off during the negative excursions of normally applied voltages. By this means, when the reference voltage on grid 45 is 180° out of phase with respect to the voltage from oscillator 10 on grid 47, the output signal from tube 42 will be zero, since the tube will be cut off at all times. When the two voltages are in phase, the tube is cut off only half the time, and the output from the detector tube will be a maximum and will consist of negative pulses during the positive half cycle of the applied grid voltages. As the phase difference between the signals on grids 45 and 47 varies between 0° and 180°, the portion of the cycle during which the tube is cut off correspondingly varies, since the plate current can flow only while both grids are "on." The output pulses from the tube then will vary in duration and also to some extent in amplitude. Thus, the average of these pulses or corresponding D.C. value is substantially linearly proportional to the phase difference between the reference signal and the signal from the local oscillator and can form a phase error control signal. Since the plate of tube 42 is coupled to the junction of voltage-sensitive capacitors 27 and 28, it follows that the capacitance of the tank circuit 25 will be varied as a function of the phase difference between the local oscillator and reference signals. This variation is caused to be in a direction to change the phase of the local oscillator output fed back to grid 47 in a sense to reduce the phase error control signal by bringing the local oscillator phase to that of the reference signal. Thus the phase of the output signals from the local oscillator is synchronized with respect to the phase of the applied reference signals.

It may be noted that the phase detector tube 42 possesses the amplitude limiting characteristic of a gated beam pentode. This means that amplitude noise appearing in the reference signal is effectively removed from the output of the detector so that fluctuations of phase of the local oscillator caused by the amplitude noise are materially reduced. Additionally, the integrating circuits such as 50, 48 usually placed in the output of the phase detector to provide a pure D.C. signal may be of a relatively short time constant. The integrating circuits may then be only large enough to average the plate current pulses and the carrier frequency rate. Accordingly, the smaller time constant of the integrating circuits permits a high speed of response of the over-all phase control system. Furthermore, if desired, the local oscillator 10 may be stabilized with a conventional crystal control loop 35 as shown in the drawing. If this is done, the deviations in phase of the local oscillator will be less and the required pull-in range for the system may be materially reduced.

Figure 2:
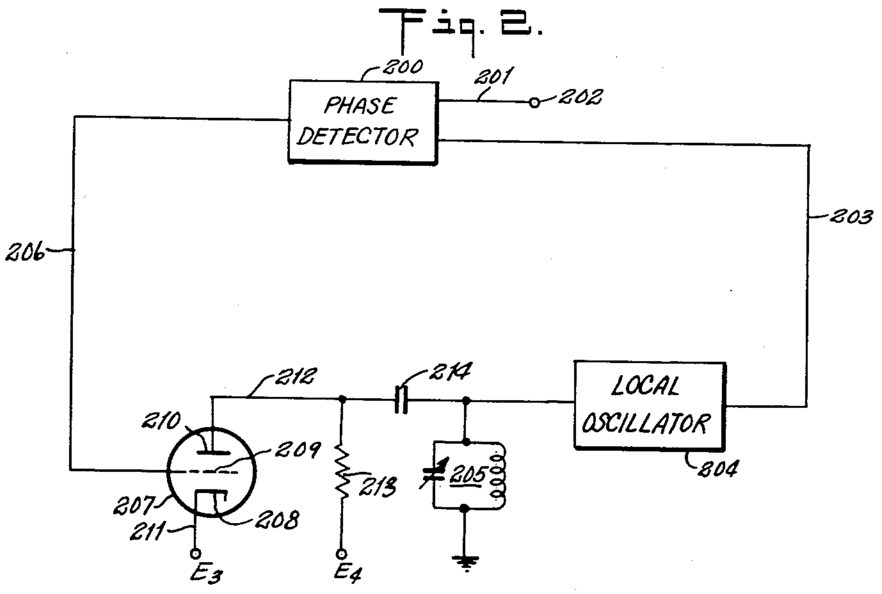
FIG. 2 is a schematic circuit diagram of an automatic phase control system utilizing an alternative means for controlling the phase of the local oscillator.

FIG. 2 of the drawing illustrates an automatic phase control system similar to the system of FIG. 1 but with a different type of phase-controlling device employed with the local oscillator. As seen in the drawing, the system comprises a phase detector 200, which may be of the same type as the phase detector 40 in the arrangement of FIG. 1. The reference signal is applied to a terminal 202, which is coupled to the phase detector by lead 201. A lead 203 couples the output signal from the local oscillator 204 to the phase detector. A resonant or tank circuit 205 of conventional type is shown schematically as coupled to the local oscillator 204, and functions to control the phase and frequency of the output voltage from the oscillator. The phase error voltage from the phase detector 200 is coupled by a lead 206 to the grid 209 of a triode 207. The triode 207 also includes a cathode 208 and a plate 210. The cathode 208 is coupled by a lead 211 to a bias voltage $E_3$. Plate 210 of the triode is coupled by lead 212 and capacitor 214 to the tank circuit 205 of the local oscillator. Plate supply voltage $E_4$ is coupled to the plate of the triode through plate resistor 213 and lead 212. From the foregoing description, it is seen that triode 207 is effectively connected in shunt with the tank circuit 205 of the local oscillator. Accordingly, as the voltage applied to grid 209 varies as a function of phase difference, the plate resistance of the tube varies and changes the phase of the output signal from the local oscillator. Essentially, the triode functions as a controlled variable resistance in this embodiment of the invention. In all other respects, however, the circuit of FIG. 2 operates in the same manner as the circuit of FIG. 1.

Figure 3:
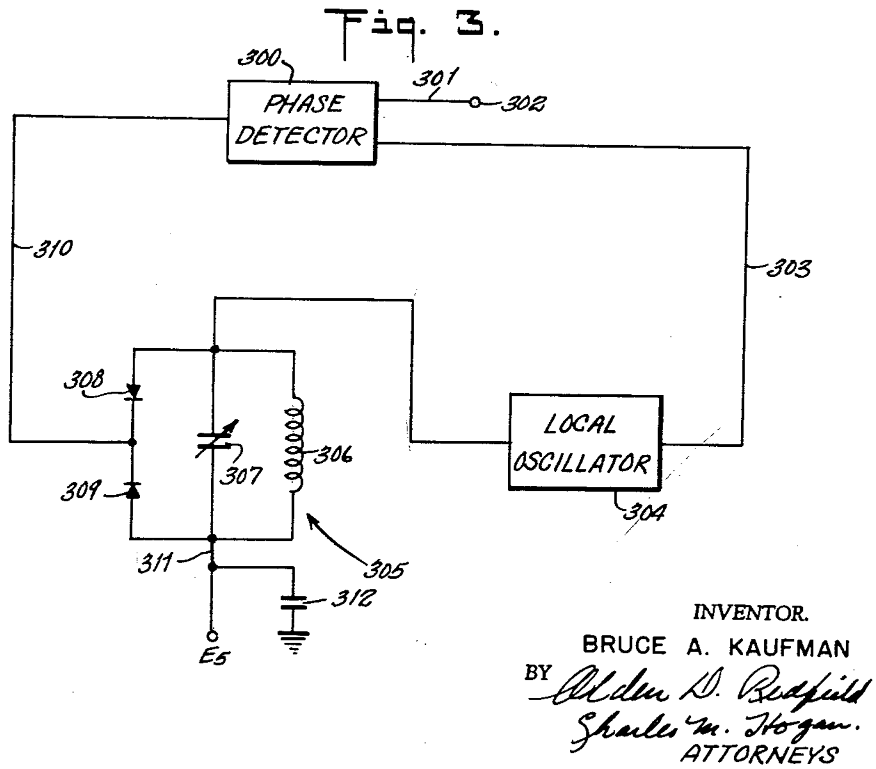
FIG. 3 is a schematic circuit diagram of an automatic phase control system utilizing still another means for controlling the phase of the local oscillator.

FIG. 3 of the drawing shows an automatic phase control system which utilizes the non-linear resistance characteristic of reversely connected diodes to control the phase of the local oscillator. Again, the phase detector 300 may take the form of the phase detector shown in FIG. 1. The reference signal appearing at terminal 302 is coupled to the detector by a lead 301. A lead 303 couples the output of a local oscillator 304 to the other input of the phase detector. The tank circuit of the local oscillator is shown generally as 305 and comprises a coil 306 and a variable capacitor 307 connected in parallel. A pair of semi-conductor diodes 308 and 309 are serially connected in opposition across the parallel combination of coil 306 and capacitor 307. The output of the phase detector 300 is coupled by a lead 310 to the junction of the diodes 308, 309. Lead 311 serves to couple the tank circuit to a supply voltage source $E_5$, while capacitor 312 functions as the usual A.C. ground connection. In operation, this circuit utilizes the non-linear resistance characteristic of reversely connected semiconductor devices such as selenium rectifiers, for example. Since the diodes are connected in shunt with the tank circuit of the local oscillator, a variation in their resistance caused by a change in the output from the phase detector 300 will vary the phase of the output signals from the local oscillator. Thus, a simple and effective automatic phase control system is provided.

It is believed obvious that the automatic phase control system disclosed herein could be extended to other uses with but obvious modifications apparent to those skilled in this art. For example, the phase detector unit could be replaced by a frequency detector circuit of any conventional type and the over-all system be employed as an automatic frequency control system. This, of course, finds use in many applications including use as an automatic frequency control system for the RF tuner in automatic tuning systems for radio and television receivers and the like. Furthermore, it is believed apparent that the disclosed system could be employed to control oscillators of other types than the type described herein. Accordingly, it is intended that the subject matter shown and described herein be regarded as ilustrative and not in a limiting sense.

What is claimed is:

A combined automatic phase and frequency control system for controlling the phase and stabilizing the frequency of the output signals of an oscillator, comprising:

an electron discharge comparator device of the gated-beam pentode type having cathode, first grid, second grid, third grid, and anode electrodes;

a by-passed cathode resistor connected between said cathode and a point of reference potential;

a source of space current having positive and negative terminals, the negative terminal of said source being connected to said point of reference potential;

first and second resistive connections between said positive terminal and said anode and second grid, respectively;

an oscillator tube having a cathode, a first grid, a second grid, and an anode;

a third resistive connection between said positive terminal and the second grid of said oscillator tube;

an oscillator output transformer having a primary connected between the anode of the oscillator tube and a point on the third resistive connection, said output transformer also including a secondary connected in series between the third grid of the comparator device and said point of reference potential for applying to said third grid the output signals of said oscillator;

a direct connection between the cathode of the oscillator device and said point of reference potential;

a grid resistor connected between the first grid of said oscillator tube and said point of reference potential;

a piezoelectric crystal connected between the first and second grids of said oscillator tube for stabilizing its frequency;

a first by-pass capacitor connected between the second grid of the oscillator tube and said point of reference potential;

means for applying reference signals to the first grid of said comparator device;

the combination of a coupling capacitor and a resonant tank circuit and a second by-pass capacitor connected in series and in the order named between the first grid of said oscillator and said point of reference potential, said resonant circuit comprising two parallel branches, one of said branches consisting of an inductor and the other of said branches consisting of a series pair of voltage-sensitive capacitors having a junction therebetween;

and a fourth resistive connection between the anode of said comparator device and said junction for coupling the output of said comparator device to said voltage-sensitive capacitors to control the phase of the output signals of said oscillator;

the first-mentioned by-passed resistor biasing said comparator device so that it is driven to cut-off by signals applied to either its first or third grid, whereby the comparator device produces in its output circuit phase error signals which are a function of the phase difference between the signals applied to its first and third grid electrodes.

References Cited in the file of this patent

UNITED STATES PATENTS

| | | |
|---|---|---|
| 2,233,165 | Goldman | Feb. 25, 1941 |
| 2,617,040 | Bailey | Nov. 4, 1952 |
| 2,654,033 | Dome | Sept. 29, 1953 |
| 2,688,085 | Keizer et al. | Aug. 31, 1954 |
| 2,768,296 | Herzog | Oct. 23, 1956 |
| 2,801,336 | Neeteson | July 30, 1957 |
| 2,898,399 | Hinsdale et al. | Aug. 4, 1959 |
| 2,907,880 | Janssen et al. | Oct. 6, 1959 |

FOREIGN PATENTS

| | | |
|---|---|---|
| 561,323 | Great Britain | May 15, 1944 |

OTHER REFERENCES

"Voltage-Sensitive Capacitors," by Jenkins in Electrical Manufacturing, December 1954, pages 83–88.